United States Patent [19]

Liessen et al.

[11] 4,301,721
[45] Nov. 24, 1981

[54] ROLL-JOURNAL BEARING MOUNTING

[75] Inventors: Karl-Heinz Liessen, Krefeld; Erwin Janssen, Kempen, both of Fed. Rep. of Germany

[73] Assignee: Eduard Küsters, Krefeld, Fed. Rep. of Germany

[21] Appl. No.: 141,807

[22] Filed: Apr. 21, 1980

[51] Int. Cl.³ .......................... B30B 3/04; F16C 7/04; F16C 35/00
[52] U.S. Cl. ....................................... 100/170; 308/9; 72/237
[58] Field of Search ................................ 100/161–172, 100/176; 72/237, 245; 308/9, 20, 59

[56] References Cited

U.S. PATENT DOCUMENTS

| | | | |
|---|---|---|---|
| 1,499,332 | 7/1924 | Baumann | 308/9 |
| 2,704,022 | 3/1955 | Schwarz | 100/163 R |
| 3,679,272 | 7/1972 | Costa et al. | 308/9 |
| 3,884,141 | 5/1975 | Lehmann | 100/163 R |
| 4,185,879 | 1/1980 | Hars et al. | 308/20 |

*Primary Examiner*—Peter Feldman
*Attorney, Agent, or Firm*—Kenyon & Kenyon

[57] ABSTRACT

A roll-journal bearing mounting is provided by a movable bearing housing from which pistons rigidly extend in opposite directions into cylinders rigidly fixed against displacement. Introduction of pressurized fluid to the cylinders moves the bearing housing either way in the direction of the pistons and cylinders. Consequently, a roll journaled by bearings in the bearing housings of two of the mountings can be moved towards and from a counter roll to apply roll nip pressure. At the same time the rigidly extending pistons in their rigidly fixed cylinders also function to hold the journal loading in a right angular direction, eliminating the need for the use of separate devices for that purpose.

10 Claims, 5 Drawing Figures

ROLL-JOURNAL BEARING MOUNTING

BACKGROUND OF THE INVENTION

Textile and paper web calenders, for example, require the use of at least two cooperating rolls having journals supported by bearings positioned in bearing housings and the housings for one of the rolls must be provided with devices, usually of the cylinder and piston type, for moving that roll against the other roll to effect the line or nip pressure required to process the web. In addition, the housings of that roll must be provided with other devices for holding the housings against movement in a direction at right angles to the line pressure, under the forces exerted in that direction by the action of the web on the roll.

In other words, two separate devices have been required, one to provide the force required for the line pressure between the rolls and another to hold the bearing housings against displacement at right angles to the line pressure. This requirement has caused design complications and undesirably large manufacturing and maintenance costs.

Examples of the above are provided by the Seidel U.S. Pat. No. 3,158,088, Nov. 24, 1964, and the Kesler U.S. Pat. No. 3,451,332, June 24, 1969.

The object which lead to the present invention was to eliminate the need for such two devices, one to apply the roll line or nip pressure, and the other to hold the roll against displacement transversely or at right angles to the direction of the application of pressure.

SUMMARY OF THE INVENTION

With the above in mind, the present invention is in the form of a roll-journal bearing mounting comprising cylinders having interfacing and interspaced open ends and provided with means for holding the cylinders against displacement in any direction. The bearing housing for holding the roll-journal bearing is spaced between these ends and is provided with pistons rigidly fixed to the housing so as to extend from the housing respectively in opposite directions and into the open ends of the cylinders. The opposite cylinder ends are closed so that pressurized fluid, usually hydraulic, can be fed into the cylinders behind the pistons so as to cause movement of the housings and pistons either way in the directions the pistons extend from the housing.

When a roll is provided with such mountings for its journal bearings, control of the fluid fed or introduced to the cylinders serves to provide the line pressure assuming the roll is bearing against a counter roll fixedly journaled or possibly working against a third roll which is fixedly journaled. At the same time, in each instance the new mounting via the housing's rigidly extending pistons working in the rigidly fixed cylinders, positively holds the roll using the new journal bearing mountings against lateral or transverse movement. This eliminates the need for other devices for this purpose. The two rigidly extending pistons prevent motion of the bearing housing in any direction other than in line with the pistons and which is the direction required to provide roll line pressure. Release of the pressure behind the pistons pointing away from the direction of pressure application permits quick release of the roll pressure and separation of the rolls involved should this be required.

Because of the rigid interrelationship of the two pistons, they and the cylinders in which they work can be made with diameters as large or larger than the piston stroke of the two pistons, because the pistons cannot cant in the cylinders. With the large diameters thus made possible, large displacement forces exerted on the bearing housings in a direction transverse to the pistons and cylinders can be safely carried.

A specific example of this invention is illustrated by the accompanying drawings and described in detail hereinafter.

BRIEF DESCRIPTION OF THE DRAWINGS

In these drawings.

DETAILED DESCRIPTION OF THE INVENTION

Figure 1:
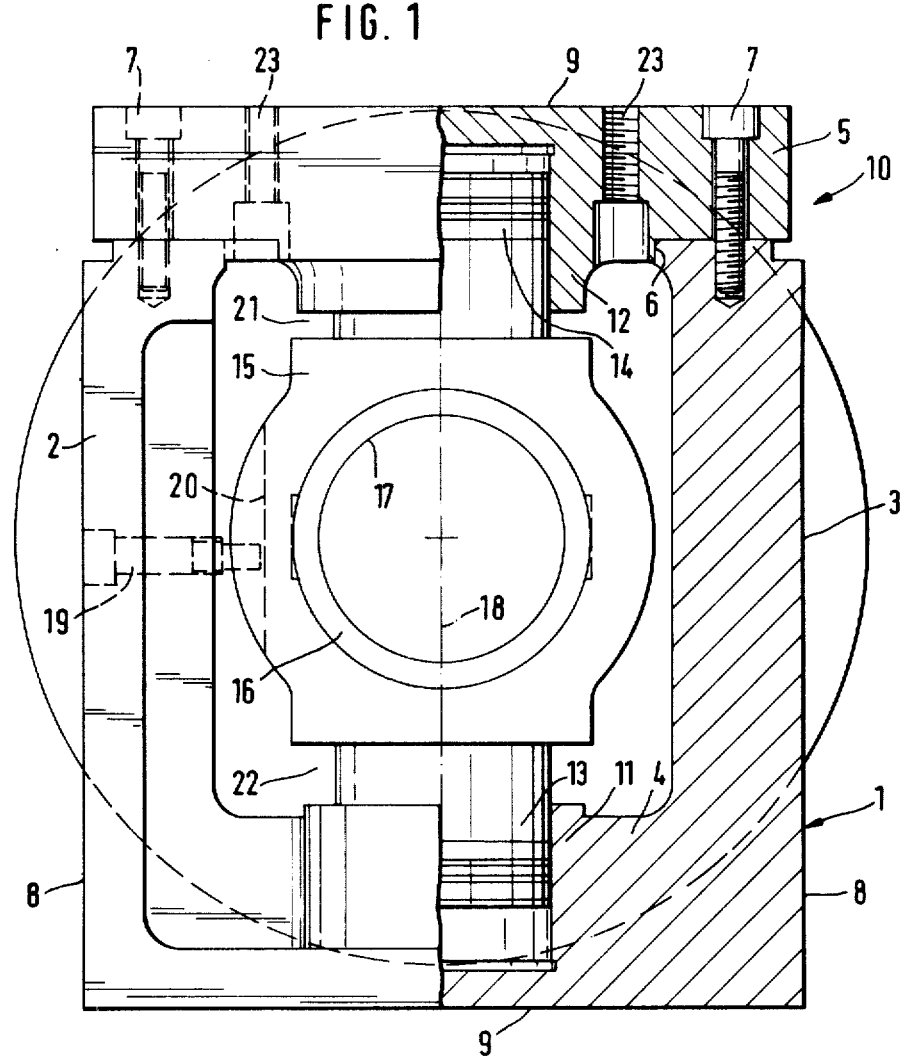
FIG. 1 on the left-hand side shows the new mounting in elevation and on the right-hand side in cross section.
Figure 2:
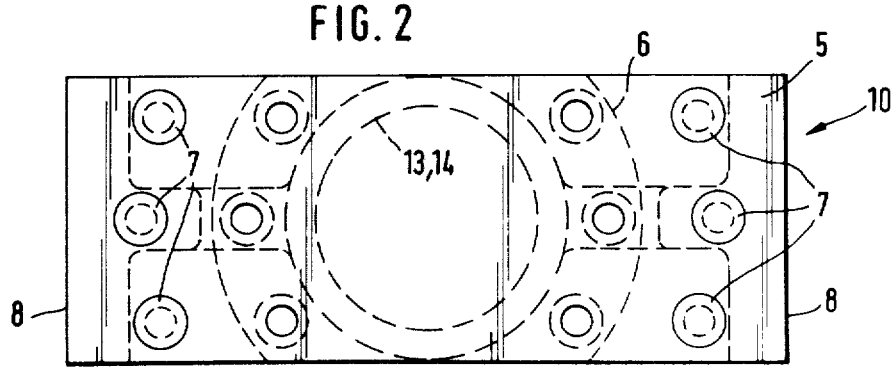
FIG. 2 is a top view of FIG. 1.

In this illustrated example of a roll-journal bearing mounting embodying the present invention, the mounting 10 comprises a rectangular frame formed by side columns 2 and 3 which at one of their ends are integrally interconnected by an end cross beam 4, the other ends of the columns being interconnected by a removable end cross beam 5, the latter being centered via extensions 6, or guiding surfaces, and being fixed to the ends of the columns 2 and 3 by cap screws 7. In this way a strong and substantially rectangular frame is formed with outside surfaces 8—8 of the columns 2 and 3 flat and parallel to each other. The outside surfaces 9—9 of the cross beams are flat and parallel to each other. The flat surfaces 8—8 are at right angles to the flat surfaces 9—9 so that all the outside surfaces of the frame are adapted to be fitted to other flat surfaces and secured to them. Such flat surfaces may include those of two adjoining mountings.

Each cross beam 9 is bored with blind bores to form the cylinders 11 and 12 having the interfacing and interspaced open ends. These cylinders are coaxial or aligned with each other and their ends opposite to their open ends are, of course, closed by the metal of the end cross beams. Although not illustrated, it is to be understood that the closed end of each cylinder is provided with passages so that pressurized fluid, such as hydraulic liquid, can be fed into the cylinders at those ends.

Each cylinder contains one of the two pistons 13 and 14 which are rigidly fixed, preferably integral with the bearing housing 15 which is spaced between the end cross beams. This bearing housing and its rigidly extending pistons are movable parallel to the side columns 2 and 3. The housing 15 is shown as having a passage 16 in which a self-aligning bearing 17 is positioned with its outer periphery locked against movement relative to the housing 15 by any conventional means. Therefore, the roll-journal bearing is positioned with its axis in a fixed position relative to the housing 15, and the axes of the cylinders and pistons are both coaxial and aligned so as to intersect this position which, for practical purposes, is the axis of the roll's journal or roll neck. The common axis of the pistons and cylinders which extend through the roll journal axis is indicated at 18 and because the bearing 17 is self-aligning, there is the possibility that the bearing housing 15 might twist or turn about this axis. To prevent this, a screw 19 is screwed through a hole formed in one of the side columns 2, with its end engaging a slot 20 formed in the side of the bearing housing 15 and extending parallel to the axis 18 of the cylinders and pistons. This locks the housing against twisting about the axis 19 while permitting the housing to move in the direction of the axis 18.

The side columns 2 and 3 are long enough to form spaces 21 and 22 between the housing 15 and the insides of the end cross beams 4 and 5 so as to permit the housing motion and the piston strokes to be adequate to generate the roll's line pressure, to compensate for diameter changes of the roll involved and which might be caused by roll resurfacing, to permit the roll involved to be moved adequately to open the nip it makes with the counter roll reasonably extensively, etc.

The entire frame comprising its two side columns 2 and 3, which carry tension of compression stress, and its two cross beams 4 and 5 which are subject to beam stress, can be designed to carry all of the stresses to be anticipated when the new bearing mounting is installed and working. Because of the frame's flat sides, it may be fixed to the frame of a corresponding mounting, or to a rigid support, the holes indicated at 23 being adapted to receive cap screws which can be passed upwardly above what is in this instance the surface 9, and into the corresponding screw holes of another of the new mountings or to any suitable support.

Figure 3:
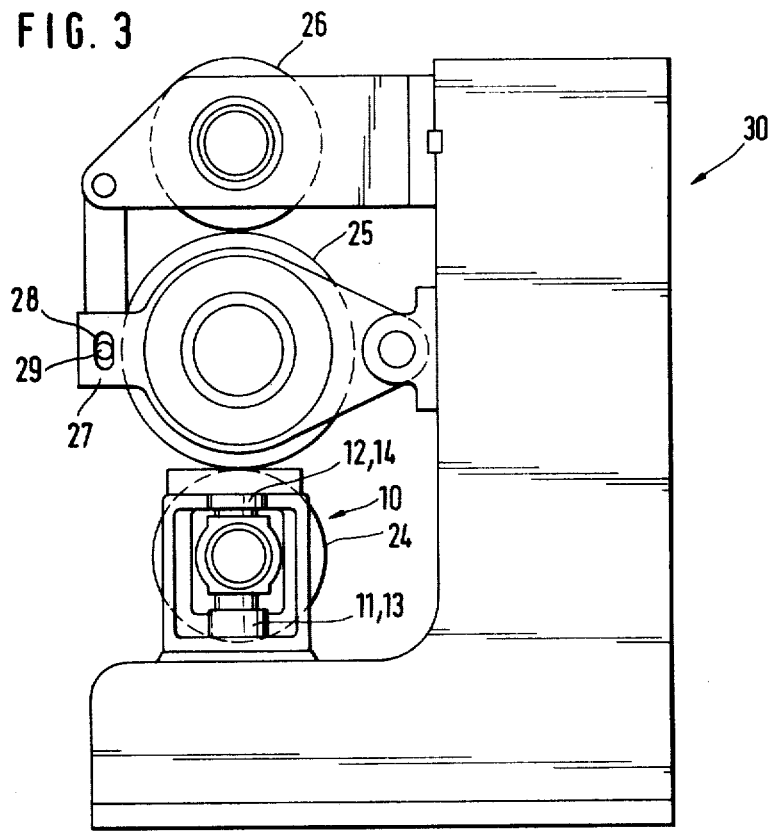
FIG. 3 is a side elevation of a three-roll calender with the bottom roll having its journal bearings mounted by the mountings of this invention.

To illustrate such possibilities, FIG. 3 shows a three-roll calender 30 in which the new bearing mounting 10 is mounted by screws passed through its holes 23.

The new mountings 10 in FIG. 3, one for each end of the roll, serve to both position the roll positively against horizontal motion at right angles to the roll, while providing in the vertical direction for the application of line pressure. In FIG. 3 the lower roll 24 bears against a vertically movable counter roll 25 for which an upper vertically fixed roll 26 provides a reaction. The roll 25, normally rotatively powered, is mounted by a swinging bracket 27 for vertical movement limited via a slot 28 in the bracket and which is engaged by a pin 29 on the end of a swinging link pivoted by the bracket in which the uppermost roll 26 is journaled.

Admission of pressurized fluid to the lower cylinders of the mountings 10 for the journal bearings of the lowermost roll 24 serves to not only generate the line pressure, but when relieved to permit rapid opening of the roll nip, the bracket 27 dropping to the limit of the slot 28 and preventing the roll 25 from moving further downwardly after losing the support of the roll 24.

In use, the web wraps around the roll 24 and sinuously up around the rolls 25 and 26, so the roll 24 is loaded in the horizontal direction as well as vertically. This load is easily accommodated by the new bearing mountings without the need for any other devices intended for this purpose.

Figure 4:
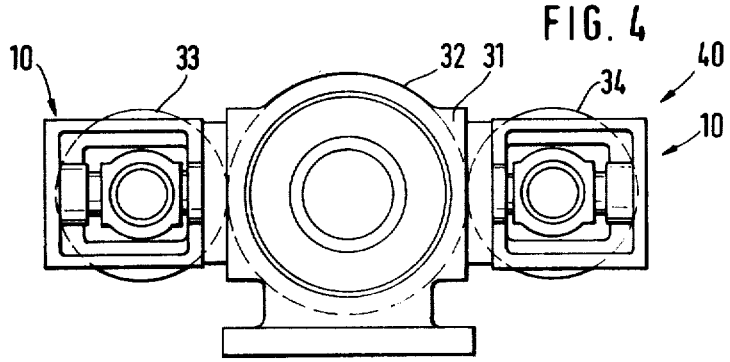
FIG. 4 is a side elevation of an example using three rolls with the two outside rolls using the new mountings.

In FIG. 4 a three roll arrangement 40 is shown in which two rolls 33 and 34 using the new bearing mountings 10 have their mounting frames horizontally screwed to the bearing housing 31 of the center roll 32. No overall large machine frame is necessary for mounting all three rollers. It is replaced completely by the self-supporting bearing mountings 10.

Figure 5:
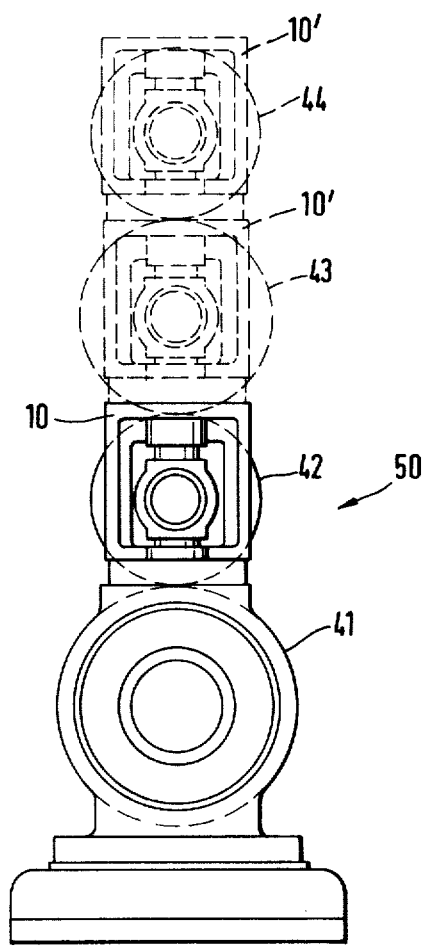
FIG. 5 is a side elevation showing in solid lines a bottom roll against which an upper roll works and using the new mountings, while also showing via broken lines how one of the new mountings can be stacked on another.

FIG. 5 shows a smoothing calender 50 formed by screwing one pair of the new mountings 10 on the housing for the lower roll 41. As indicated by dotted lines, the smoothing machine can be formed into a multi-roll calender by adding still further rolls 43 and 44, each having its journals in bearings supported by the new mountings shown at 10'. All of the frames can be stacked one on the other via the flat outsides of their end cross beams, it being understood that the end cross beam 4 shown in FIG. 1 can also be provided with screw holes as is the removable cross beam 5.

All pressure-rolling rolls have journals or roll necks and a pressure-rolling body of very substantially larger radial dimension or diameter than that of the journals or roll necks. As shown by FIG. 1, the frame's end cross beams are interspaced by the frame's side columns a distance related to the stroke lengths of the pistons so as to permit the mounting to be combined with one or more other corresponding mountings, or to other pressure rolling roll assemblies, as indicated by FIGS. 3 through 5. The new mounting permits its design to be such that its frame's side columns can be interspaced a distance less than the radial dimension of the pressure-rolling body itself, as is also shown by the accompanying drawings.

What is claimed is:

1. A roll-journal bearing mounting comprising cylinders having interfacing and interspaced open ends, holding means for holding said cylinders against displacement, a movable bearing housing spaced between said ends, and pistons rigidly connected to said housing so as to extend therefrom respectively in opposite directions and into said open ends of the cylinders, the ends of said cylinders opposite to their said open ends being closed so that pressurized fluid can be fed into the cylinders behind said pistons so as to cause movement of the housing and pistons either way in the directions said pistons extend from said housing in said cylinders.

2. The mounting of claim 1 in which said bearing housing has a transverse passage adapted to receive and position the roll-journal bearing with its axis in a fixed position relative to the housing and the axes of said cylinders and pistons are coaxial and intersect said position.

3. The mounting of claim 2 in which said holding means for said cylinders comprises a frame having end cross beams in which said cylinders are fixed and side columns on the sides of said bearing housing and having ends fixed to said cross beams and holding them against displacement, said side columns being interspaced so as to permit said movement of said housing and piston.

4. The mounting of claim 3 in which said frame has at least one outside surface which is flat so that the frame can be fastened to a flat supporting surface.

5. The mounting of claim 3 in which said frame's said cross beams and side columns are right angularly oriented relative to each other and each of said cross beams has an outside surface corresponding to said at least one outside surface.

6. The mounting of claim 5 in which said cylinders are bored in said cross beams and the cylinders and said pistons have radial dimensions large enough for the pistons to support radial loading in all radial directions applied to said bearing housing when a working roll-journal bearing is positioned by said bearing housing.

7. The mounting of claim 6 in which at least one of said cross beams is removably fixed to the ends of said side columns.

8. The mounting of claim 7 in which a bearing is positioned in said passage of said bearing housing and a roll has a roll journal held by said bearing and has a pressure rolling body of substantially larger radial dimension than that of said journal, the frame's said end cross beams being interspaced by the frame's said side columns a distance related to the stroke lengths of said pistons so as to permit said mounting to be combined with at least one other corresponding mounting and pressure rolling roll.

9. The mounting of claim 8 in which the frame's said side columns are interspaced a distance less than the radial dimension of said pressure rolling body.

10. The mounting of claims 1, 2, 3, 4, 5, 6, 7, 8 or 9 having means for holding said housing against rotation about said axes of the pistons and cylinders while permitting said movement of the housing and pistons.

* * * * *